United States Patent
Chen et al.

(10) Patent No.: US 11,699,827 B2
(45) Date of Patent: Jul. 11, 2023

(54) BATTERY LOWER CASING AND BATTERY SYSTEM

(71) Applicants: Jiangsu Contemporary Amperex Technology Limited, Jiangsu (CN); Contemporary Amperex Technology Co., Limited, Ningde (CN)

(72) Inventors: Yuchao Chen, Jiangsu (CN); Xiaoshan Dai, Jiangsu (CN)

(73) Assignees: Jiangsu Contemporary Amperex Technology Limited, Changzhou (CN); Contemporary Amperex Technology Co., Limited, Ningde (CN)

( * ) Notice: Subject to any disclaimer, the term of this patent is extended or adjusted under 35 U.S.C. 154(b) by 637 days.

(21) Appl. No.: 16/487,031

(22) PCT Filed: Jul. 11, 2019

(86) PCT No.: PCT/CN2019/095564
§ 371 (c)(1),
(2) Date: Aug. 19, 2019

(87) PCT Pub. No.: WO2021/000340
PCT Pub. Date: Jan. 7, 2021

(65) Prior Publication Data
US 2021/0359366 A1 Nov. 18, 2021

(30) Foreign Application Priority Data
Jul. 3, 2019 (CN) .......................... 201921023624.X

(51) Int. Cl.
*H01M 50/209* (2021.01)
*H01M 50/262* (2021.01)
*H01M 50/233* (2021.01)
*H01M 10/04* (2006.01)
*H01M 50/249* (2021.01)

(52) U.S. Cl.
CPC ..... *H01M 50/209* (2021.01); *H01M 10/0413* (2013.01); *H01M 50/233* (2021.01); *H01M 50/249* (2021.01); *H01M 50/262* (2021.01); *H01M 2220/20* (2013.01)

(58) Field of Classification Search
CPC ............ H01M 50/209; H01M 50/249; H01M 50/262; H01M 50/233; H01M 222/20
See application file for complete search history.

(56) References Cited

U.S. PATENT DOCUMENTS

| 2010/0015512 A1* | 1/2010 | Inoue ................ H01M 10/6551 361/714 |
| 2018/0236863 A1* | 8/2018 | Kawabe .................... B60K 1/04 |
| 2018/0272853 A1 | 9/2018 | Wang et al. |

FOREIGN PATENT DOCUMENTS

| CN | 107742683 | * | 2/2018 | |
| CN | 207800720 U | | 8/2018 | |
| CN | 208674230 U | | 3/2019 | |
| CN | 109920949 A | | 6/2019 | |
| CN | 209176495 U | | 7/2019 | |
| WO | WO 2015/149660 | * | 10/2015 | .............. H01M 2/02 |
| WO | WO 2015149660 | * | 10/2015 | .............. H01M 2/02 |

OTHER PUBLICATIONS

Machine translation of CN 107742683, published on Feb. 27, 2018 (Year: 2018).*
The extended European search report for EP Application No. 19753233.6, dated Feb. 26, 2021, 8 pages.
PCT International Search Report for PCT/CN2019/095564, dated Apr. 9, 2020, 9 pages.

* cited by examiner

*Primary Examiner* — Anca Eoff
(74) *Attorney, Agent, or Firm* — East IP P.C.

(57) ABSTRACT

The disclosure relates to a battery lower casing and a battery system. The battery lower casing comprises: a support frame comprising a plurality of fixing beams that are connected end to end to form an accommodating space, wherein each of two fixing beams opposite to each other comprises a fixing portion extending toward the accommodating space, each of the fixing beams comprises fixing tabs at a side of the fixing beam away from the accommodating space, and the battery lower casing is connected to a target object through the fixing tabs; and a bottom plate connected to the fixing beams.

14 Claims, 5 Drawing Sheets

BATTERY LOWER CASING AND BATTERY SYSTEM

CROSS-REFERENCE TO RELATED APPLICATION

This application is a National Stage of International Application No. PCT/CN2019/095564 filed on Jul. 11, 2019, which claims priority to Chinese Patent Application No. 201921023624.X filed on Jul. 3, 2019 and entitled "Battery Lower Casing And Battery System", both of which are incorporated herein by reference in its entirety.

FIELD

The present disclosure relates to the technical field of power battery, and in particular to a battery lower casing and a battery system.

BACKGROUND

With increasing market share of new energy vehicles, one of important research and development directions now is how to reduce weight and cost of vehicle battery system. In order to realize the weight reduction of the vehicle battery system, on the one hand, its lower casing can be made from new materials, such as high-strength aluminum alloy, magnesium alloy and composite material. However, the material cost is high. On the other hand, the lower casing can be produced with improved production process, such as aluminum alloy die-casting and aluminum alloy stamping and welding process. However, the mold investment risk is high, and the hollow aluminum alloy profile welding process produces many welding beams and thus faces problem of poor airtightness and unsatisfied weight. Therefore, how to balance the weight reduction and cost of the lower casing of the vehicle battery system becomes an urgent problem to be solved.

SUMMARY

An object of the disclosure is to provide a battery lower casing which has a light weight and a required bearing capability and a battery system.

In one aspect, embodiments of the disclosure provide a battery lower casing comprising: a support frame comprising a plurality of fixing beams that are connected end to end to form an accommodating space, wherein each of two fixing beams opposite to each other comprises a fixing portion extending toward the accommodating space, each of the fixing beams comprises fixing tabs at a side of the fixing beam away from the accommodating space, and the battery lower casing is connected to a target object through the fixing tabs; and a bottom plate connected to the fixing beams.

In another aspect, embodiments of the disclosure provide a battery system, comprising: any battery lower casing as described above; a cover for covering the battery lower casing and forming an accommodating chamber with the accommodating space; and a plurality of battery modules housed in the accommodating chamber, wherein the battery module comprises a plurality of cells and a frame for fixing the cells, the frame comprises a plurality of positioning posts, and the frame is connected to the fixing portion of the battery lower casing through the positioning posts.

The battery lower casing according to embodiments of the disclosure carries weight of the battery module through the fixing portions of the support frame, and fixes the battery module to the target object through the fixing tabs. The bottom plate does not carry the weight, and is only used to isolate the external environment. Therefore, the weight and manufacturing cost of the battery lower casing can be minimized. The battery system according to the embodiments of the disclosure adopts any abovementioned battery lower casing and thus has a light overall weight. When the battery system is applied into a new energy vehicle, it is beneficial to improve energy conservation and weight reduction of the new energy electric vehicle and improve endurance mileage of new energy electric vehicles.

BRIEF DESCRIPTION OF THE DRAWINGS

The disclosure can be better understood from the following description of the specific embodiments of the disclosure.

Other features, objects, and advantages of the disclosure will become more apparent from the detailed description of non-limiting embodiments with reference to accompanying drawings, wherein same or similar reference signs indicate same or similar features.

REFERENCE SIGN LIST

1 battery lower casing;
10 accommodating space;
11 support frame;
110 fixing beam;
111 fixing portion;
111*a* first positioning hole;
112 fixing tab;
12 bottom plate;
121 first through hole;
13 reinforcing beam;
131 supporting portion;
131*a* second positioning hole;
132 hanging portion;
133 fixing rod;
133*a* internal thread;
133*b* shoulder portion;
133*c* recess;
2 cover;
21 second through hole;
3 battery module;
31 cell;

32 end plate;
321 positioning post;
33 side plate;
4 fixing member;
41 base;
42 protruding shaft;
W width of fixing portion;
W' width of supporting portion;
W1 gap between positioning post and adjacent fixing beam;
W1' gap between the positioning post and the adjacent hanging portion;
W2 thickness of positioning post.

DETAILED DESCRIPTION

Exemplary embodiments will now be described more thoroughly with reference to the accompanying drawings.

Figure 1:
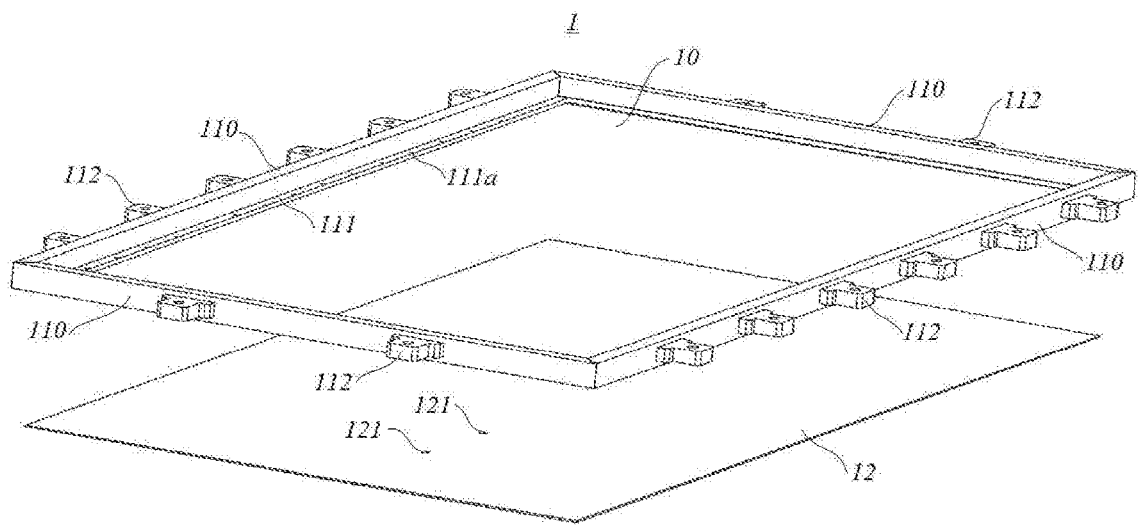
FIG. 1 is an exploded structural view of a battery lower casing according to an embodiment of the disclosure.

Referring to FIG. 1, embodiments of the disclosure provide a battery lower casing 1 comprising a support frame 11 and a bottom plate 12.

The support frame 11 comprises a plurality of fixing beams 110 that are connected end to end to form an accommodating space 10. Each of two fixing beams 110 opposite to each other comprises a fixing portion 111 extending toward the accommodating space 10. Each of the fixing beams 110 comprises fixing tabs 112 at a side of the fixing beam away from the accommodating space 10. The battery lower casing 1 can be connected to a target object through the fixing tabs 112. The target object may be, for example but not limited to, a chassis of a vehicle.

The support frame 11 may be a polygonal frame composed of four, six or eight fixing beams 110. The fixing portion 111 may carry an object having a certain weight placed in the accommodating space 10. The fixing tab 112 comprises a through hole such that the battery lower casing 1 can be fixed to the target object through fasteners.

The bottom plate 12 is connected to the fixing beams 110. The bottom plate 12 may be connected to the fixing beams 110 by any means such as welding, riveting, screw fastening, or structural adhesive bonding.

Alternatively, the fixing beam 110 is a structural member made of an aluminum profile, such as an aluminum alloy profile welding or die casting. Thus, the weight of the support frame 11 is reduced while its structural strength is satisfied. Furthermore, the bottom plate 12 is a plate made of aluminum alloy or carbon steel.

Therefore, compared with a battery lower casing 1 made by conventional carbon steel or aluminum alloy stamping or die-casting, the battery lower casing 1 according to the embodiment of the disclosure has no large one-time investment risk, but has lower cost and lower weight, simplified molding process, less welding beams, better airtightness, and reduced manufacturing cost.

The battery lower casing 1 according to the embodiment of the disclosure carries weight through the fixing portions 111 of the support frame 11, and fixes the battery lower casing 11 to the target object through the fixing tabs 112. The bottom plate 12 does not carry the weight, and is only used to isolate the external environment. Therefore, the weight and manufacturing cost of the battery lower casing 1 can be minimized.

Figure 2:
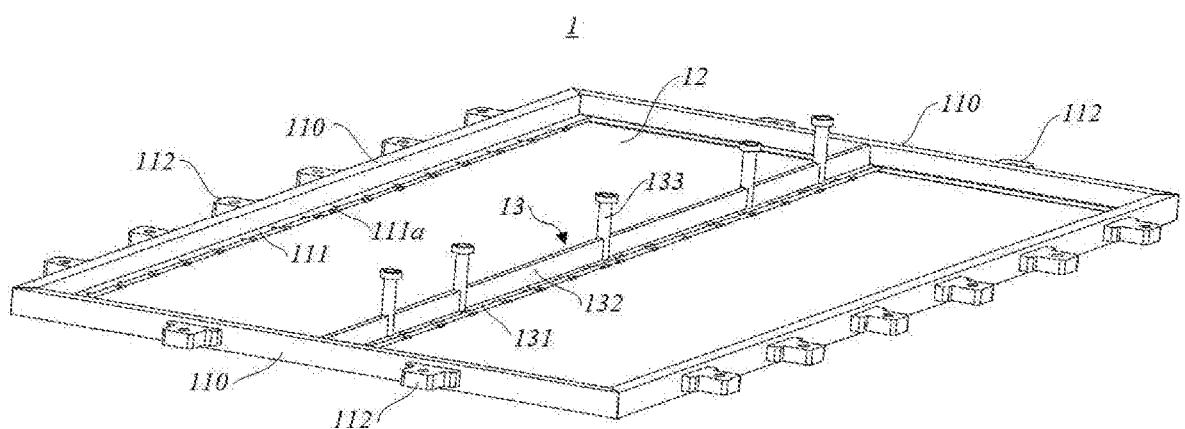
FIG. 2 is a structural schematic diagram of another battery lower casing according to an embodiment of the disclosure.
Figure 3:
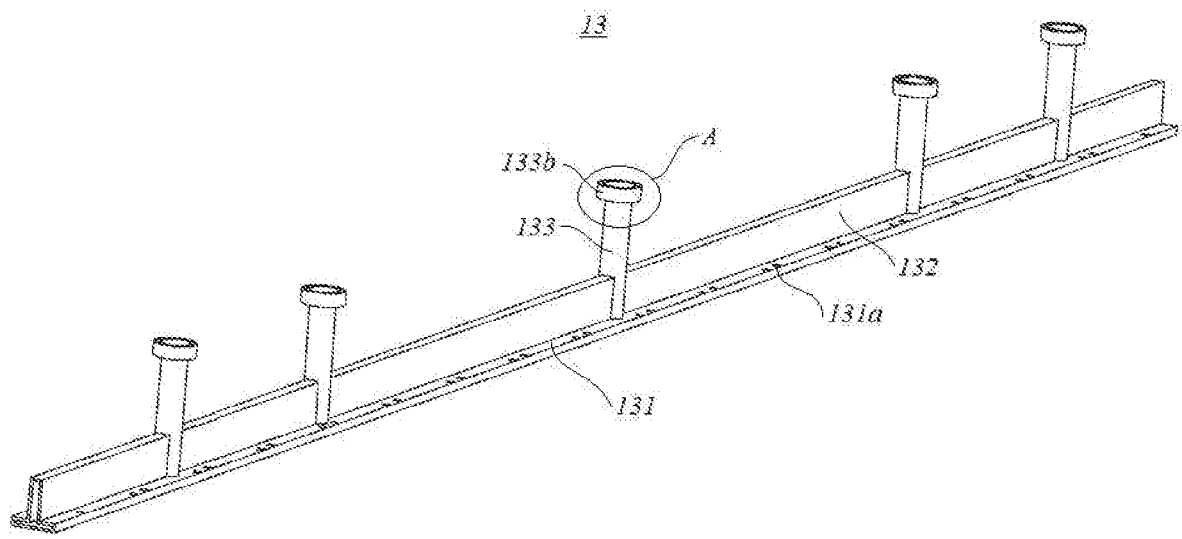
FIG. 3 is a structural schematic diagram of a reinforcing beam of the battery lower casing in FIG. 2.

With reference to FIG. 2 and FIG. 3, when the battery lower casing 1 needs to carry a large number of objects, the objects can be arranged in two or more rows. In order to improve the carrying capacity of the battery lower casing 1, the support frame 11 can also comprise a reinforcing beam 13 disposed in the accommodating space 10. The reinforcing beam 13 comprises a plurality of fixing rods 133. The battery lower casing 1 can also be connected to the target objects through the fixing rods 133. There can be one or more reinforcing beams 13 depending on the number of objects to be carried by the battery lower casing 1.

Specifically, the reinforcing beam 13 comprises a supporting portion 131 and a hanging portion 132 which are disposed to intersect with each other. For example, the supporting portion 131 is located in a horizontal plane, while the hanging portion 132 is located in a vertical plane. The fixing rod 133 is disposed to pass through the supporting portion 131 and the hanging portion 132 such that the connection stability of the fixing rod 133 and the reinforcing beam 13 is improved. The reinforcing beam 13 may be attached to the bottom plate 12 by any means such as welding, riveting or structural bonding.

Figure 4:
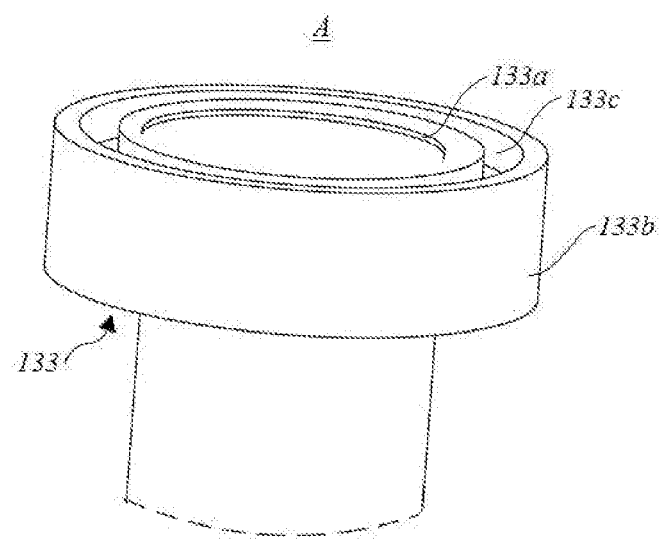
FIG. 4 is an enlarged structural view of a portion A in FIG. 3.

With reference to FIG. 1, FIG. 3 and FIG. 4, optionally, the fixing rod 133 is a hollow rod. The bottom plate 12 comprises a first through hole 121 disposed corresponding to the fixing rod 133, and the fixing rod 133 comprises an internal thread 133a for threadedly connecting with other components at an end away from the supporting portion 131.

Furthermore, the fixing rod 133 comprises a shoulder portion 133b around its periphery at an end away from the supporting portion 131. The shoulder portion 133b comprises a recess 133c for accommodating a sealing member. For example, an O-ring may be disposed in the recess 133c.

The fixing rod 133 is hollow inside and thus has a reduced weight. It is also convenient to provide the internal thread 133a in the fixing rod 133. When other components are screwed to the fixing rod 133, they can be sealed through a sealing member. Also, it is convenient for fasteners (for example, long bolt) to pass through the first through hole 121 and the fixing rod 133 to connect with the target object.

It can be understood that the fixing rod 133 can also be a solid rod. The fixing rod 133 can comprise an external thread at an end away from the supporting portion, and the battery lower casing 1 can also be connected to the target object through the external thread.

With reference to FIGS. 5-10, embodiments of the disclosure further provide a battery system comprising: any abovementioned battery lower casing 1, a cover 2 and a plurality of battery modules 3.

The cover 2 covers the battery lower casing 1 and forms a accommodating chamber with the accommodating space 10. For weight reduction, the cover 2 may be made of an aluminum alloy material or a plastic material.

The battery modules 3 are housed in the accommodating chamber. Each of the battery modules 3 comprises a plurality of cells 31 and a frame for fixing the cells 31. The frame comprises a plurality of positioning posts 321. The frame is connected to the fixing portion 111 of the battery lower casing 1 through the positioning posts 321.

The battery system according to the embodiments of the disclosure adopts any abovementioned battery lower casing 1 and thus has a light overall weight. When the battery system is applied into a new energy vehicle, it is beneficial to improve energy conservation and weight reduction of the new energy electric vehicle and improve endurance mileage of new energy electric vehicles.

The frame of the battery module 3 can be implemented in various ways. Optionally, the frame comprises a pair of opposite end plates 32 disposed outside of the cells 31 and side plates 33 for mating with the end plates 32 to accommodate the cells 31. The positioning posts 321 may be disposed on the end plate 32, or may be disposed on the side plate 33, or may be disposed on both the end plate 32 and the side plate 33.

Optionally, the frame comprises a pair of opposite end plates 32 disposed outside of the cells 31 and a strapping band surrounding the end plates 32 and the cells 31. The strapping band connects the cells 31 in groups. The positioning post 321 is disposed on the end plate 32.

The end plate 32 may be a plate with a uniform thickness or a plate with non-uniform thicknesses. Optionally, each end plate 32 is provided with two positioning posts 321 spaced apart from each other. Fixing members such as bolts pass through the positioning posts 321 to stably fix the battery module 3 to the fixing portion 111 of the lower battery case 1.

Figure 5:
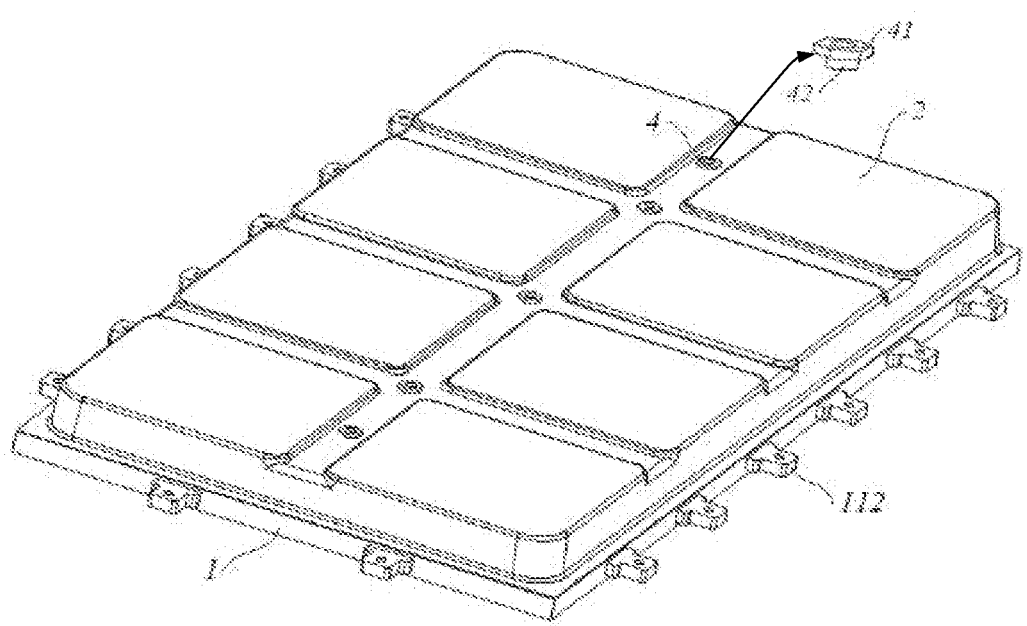
FIG. 5 is a structural schematic diagram of a battery system according to an embodiment of the disclosure.
Figure 8:
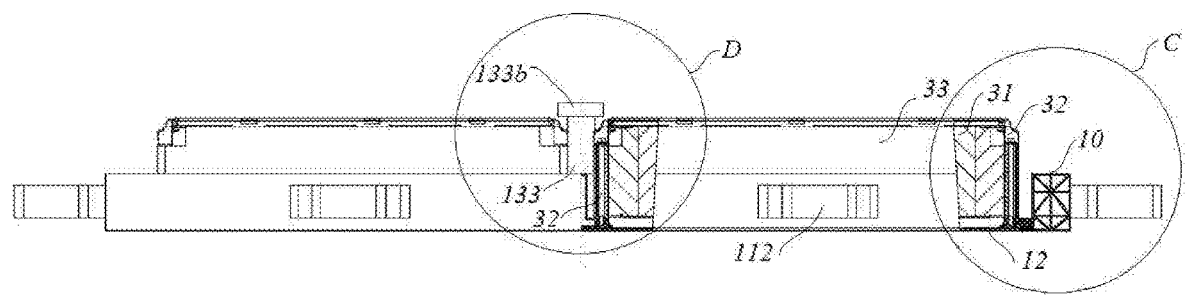
FIG. 8 is a side structural view of the battery system in FIG. 5 from which a cover is removed.
Figure 9:
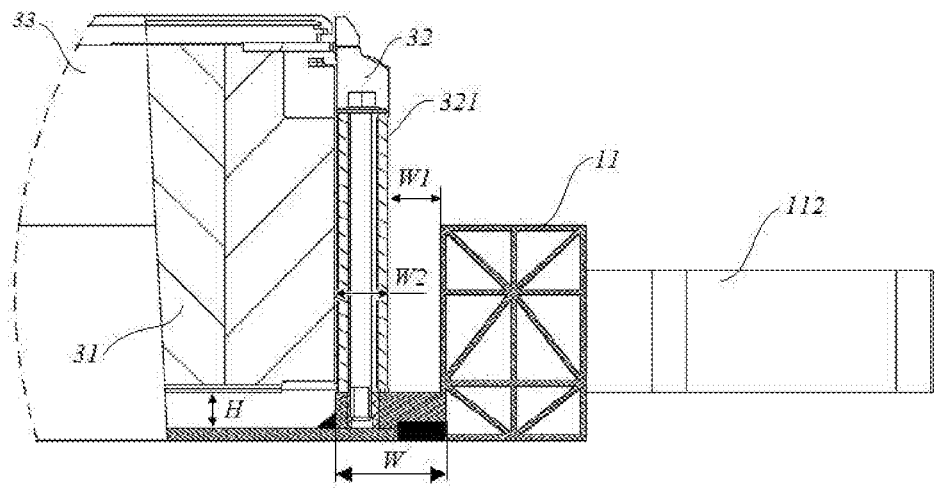
FIG. 9 is an enlarged structural view of a portion C in FIG. 8.
Figure 10:
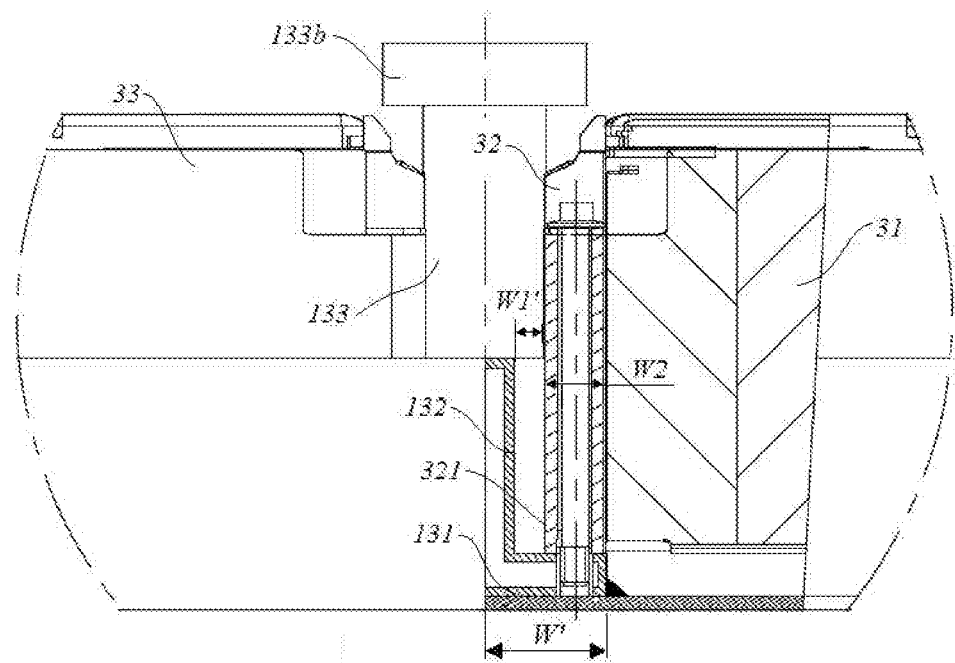
FIG. 10 is an enlarged structural view of a portion D in FIG. 8.

FIG. 8 is a side structural view of the battery system in FIG. 5 from which a cover is removed. FIG. 9 is an enlarged structural view of a portion C in FIG. 8. FIG. 10 is an enlarged structural view of a portion D in FIG. 8.

There is a gap H between a side of the bottom plate 12 of the battery lower casing 1 facing the accommodating space and a bottom surface of the battery module 3, wherein H is in a range of 2 mm<H<5 mm. The gap H can absorb impact from the ground on the bottom of the battery lower casing 1, prevent the battery module 3 from being impacted, and improve the safety of the battery system. If H is small, the bottom plate 12 of the battery lower casing 1 does not have sufficient space to buffer and absorb energy. If H is large, the battery lower casing 1 has too much useless space therein.

Furthermore, the fixing portion 111 comprises a plurality of first positioning holes 111a. The positioning posts 321 are disposed corresponding to the first positioning holes 111a.

There is a gap W1 between the positioning post 321 and the adjacent fixing beam 110, the positioning post 321 has a thickness W2, the fixing portion 111 has a width W, wherein W≥W1+W2. Due to the gap H between the bottom plate 12 of the lower case 1 and the bottom surface of the battery module 3, the battery module 3 is directly fixed to the fixing portion 111 of the battery lower casing 1 through the positioning posts 321. If W<W1+W2, the positioning post 321 at the end plate 32 of the battery module 3 is suspended there, and the battery module 3 will has a deteriorated force state and poor reliability.

When the support frame 11 of the battery lower casing 1 further comprises the reinforcing beam 13, the frame is connected to the fixing portion 111 of the battery lower casing 1 through the positioning posts 321 of one of the end plates 32, and is connected to the support portion 131 of the battery lower casing 1 through the positioning posts 321 of the other end plate 32.

Specifically, a plurality of second positioning holes 131a are respectively disposed at two sides of the supporting portion 131 of the reinforcing beam 13 with respect to the hanging portion 132 in a longitudinal direction. A part of the positioning posts 321 are disposed correspond to the first positioning holes 111a, and the other part of the positioning post 321 are disposed corresponding to the second positioning holes 131a. There is a gap W1' between the positioning post 321 and the adjacent hanging portion 132, the positioning post 321 has a thickness W2, and the supporting portion 131 has a width W' at a side of the hanging portion 132. The width W' of the supporting portion 131 meets the following condition: W'≥W1'+W2. Thus, both the second positioning holes 131a arranged in a row at a side of the hanging portion 132 and the first positioning holes 111a arranged in a row in the fixing portions 111 are used to fix the battery modules 3.

Figure 6:
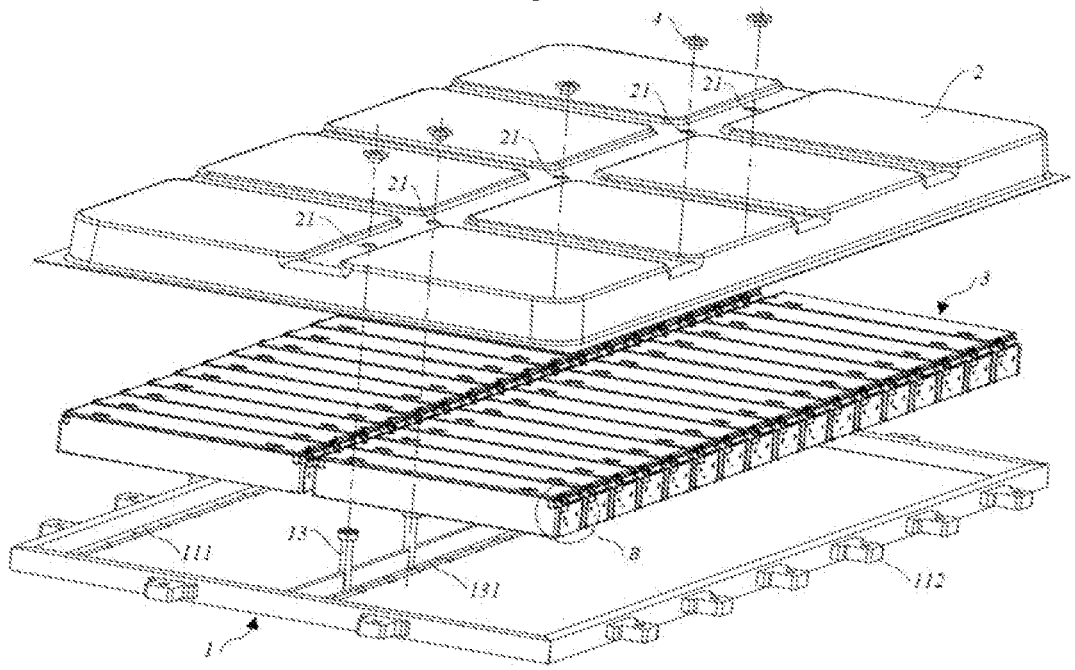
FIG. 6 is an exploded structural view of the battery system in FIG. 5.
Figure 7:
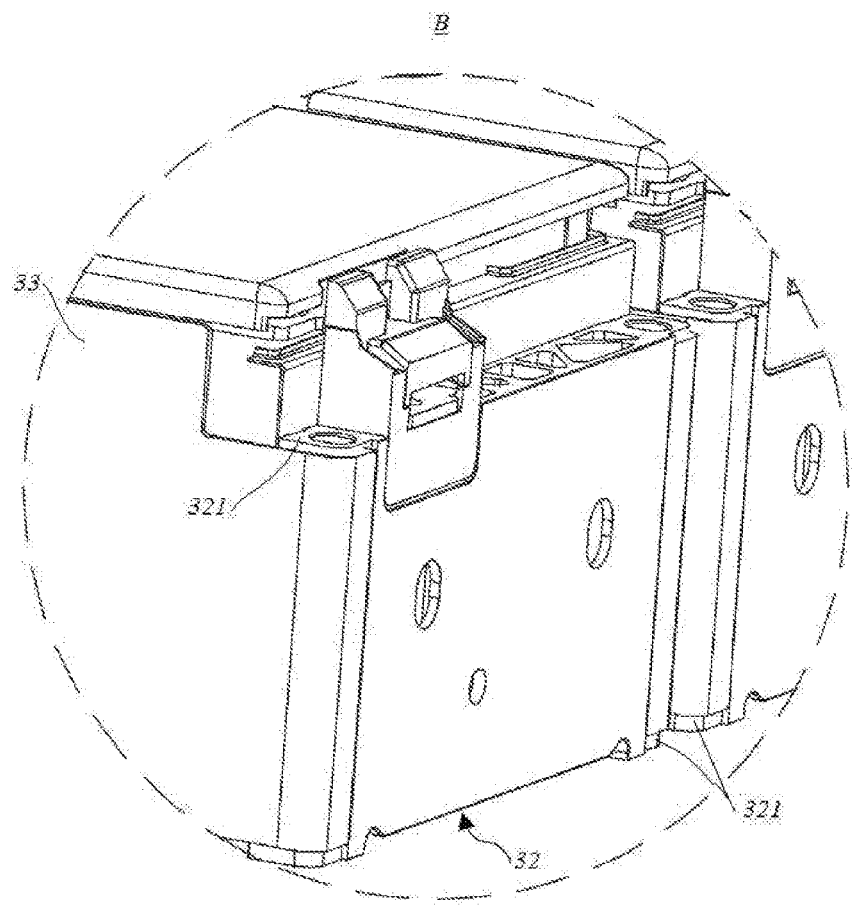
FIG. 7 is an enlarged structural view of a portion B in FIG. 5.

Furthermore, as shown in FIG. 5 and FIG. 6, the cover 2 comprises a second through hole 21 corresponding to the fixing rod 133 of the reinforcing beam 13. The battery system further comprises a fixing member 4 comprising a base 41 and a protruding shaft 42 connected to each other. The protruding shaft 42 passes through the second through hole 21 of the cover 2 and is sealingly connected to the fixing rod 133.

Specifically, the shoulder portion 133b of the fixing rod 133 abuts against an inner wall of the cover body 2, the protruding shaft 42 of the fixing member 4 has an external thread, and a sealing member is disposed in the recess 133c of the fixing rod 133. When the protruding shaft 42 passing through the second through hole 21 of the cover 2 is screwed to the fixing rod 133, the base 41 presses the sealing member such that the airtightness at the second through hole 21 of the cover 2 can be improved.

Optionally, the fixing member 4 may further comprise a through hole passing through the base 41 and the protruding shaft 42. Thereby, the bottom plate 12 of the battery lower casing 1, the fixing rod 133 and the fixing member 4 go through in an axial direction of the fixing rod 133. Therefore, a long bolt may sequentially pass through the first through hole 121, the fixing rod 133 and the fixing member 4 from a side of the bottom plate 12 of the battery lower casing 1 to fix the battery system to the target object. Also, the long bolt tightly connects the bottom plate 12 and the reinforcing beam 13 to further improve the airtightness of the battery system.

It can be understood that when the fixing rod 133 is a solid rod and comprises an external thread at an end away from the supporting portion, the through hole in the protruding shaft 42 of the fixing member 4 can also comprise an internal thread, and the protruding shaft 42 passes through the second through hole 21 of the cover body 2 and connects with the fixing rod 133 in a sealed manner.

Those skilled in the art will appreciate that the above-described embodiments are illustrative and not restrictive. Different technical features in different embodiments can be combined to achieve a beneficial effect. Other variations to the disclosed embodiments can be understood and effected by those skilled in the art in practicing the claimed invention, from a study of the drawings, the disclosure, and the appended claims. In the claims, the word "comprising" does not exclude other elements or steps; the indefinite article "a" or "an" does not exclude a plurality; and the terms "first", "second", and the like are configured for descriptive purposes only and are not to be construed as indicating or implying relative importance. Any reference signs in the claims should not be construed as limiting the scope of the invention. A single hardware or software module may fulfill the functions of several items recited in the claims. The mere fact that certain measures are recited in mutually different dependent claims does not indicate that a combination of these measured cannot be used to advantage.

What is claimed is:
1. A battery lower casing comprising:
a support frame comprising a plurality of fixing beams that are connected end to end to form an accommodating space, wherein each of two fixing beams opposite to each other comprises a fixing portion extending toward the accommodating space, each of the fixing beams comprises fixing tabs at a side of the fixing beam away from the accommodating space, and the battery lower casing is connected to a target object through the fixing tabs; and a bottom plate connected to the fixing beams, wherein a side of the bottom plate of the battery lower casing facing the accommodating space is lower than a surface of the fixing portion carrying weight;

wherein the support frame further comprises a reinforcing beam disposed in the accommodating space, the reinforcing beam comprises a plurality of fixing rods, and the battery lower casing is also connected to the target object through the fixing rods;

wherein the reinforcing beam comprises a supporting portion and a hanging portion which are disposed to intersect with each other, and the fixing rod is disposed to pass through the supporting portion and the hanging portion;

the fixing rod comprises a shoulder portion around its periphery at an end away from the supporting portion; the shoulder portion comprises a recess for accommodating a sealing member.

2. The battery lower casing according to claim 1, wherein the fixing rod is a hollow rod, the bottom plate comprises first through holes disposed corresponding to the fixing rods, and the fixing rod comprises an internal thread at an end away from the supporting portion.

3. A battery system, comprising:
a battery lower casing comprising:
a support frame comprising a plurality of fixing beams that are connected end to end to form an accommodating space, wherein each of two fixing beams opposite to each other comprises a fixing portion extending toward the accommodating space, each of the fixing beams comprises fixing tabs at a side of the fixing beam away from the accommodating space, and the battery lower casing is connected to a target object through the fixing tabs; and
a bottom plate connected to the fixing beams, wherein a side of the bottom plate of the battery lower casing facing the accommodating space is lower than a surface of the fixing portion carrying weight;
a cover for covering the battery lower casing and forming an accommodating chamber with the accommodating space; and
a plurality of battery modules housed in the accommodating chamber, wherein the battery module comprises a plurality of cells and a frame for fixing the cells, the frame comprises a plurality of positioning posts, and the frame is connected to the fixing portion of the battery lower casing through the positioning posts;
wherein the support frame further comprises a reinforcing beam disposed in the accommodating space, the reinforcing beam comprises a plurality of fixing rods, and the battery lower casing is also connected to the target object through the fixing rods;
the reinforcing beam comprises a supporting portion and a hanging portion which are disposed to intersect with each other, and the fixing rod is disposed to pass through the supporting portion and the hanging portion;
the fixing rod comprises a shoulder portion around its periphery at an end away from the supporting portion, the shoulder portion comprises a recess for accommodating a sealing member.

4. The battery system according to claim 3, wherein there is a gap H between a side of the bottom plate of the battery lower casing facing the accommodating space and a bottom surface of the battery module, wherein H is in a range of 2 mm<H<5 mm.

5. The battery system according to claim 3, wherein the frame comprises a pair of opposite end plates disposed outside of the cells and side plates for mating with the end plates to accommodate the cells, and the positioning posts are disposed at least on the end plate.

6. The battery system according to claim 5, wherein the fixing portion comprises a plurality of first positioning holes, and the positioning posts are disposed corresponding to the first positioning holes; and
there is a gap W1 between the positioning post and the adjacent fixing beam, the positioning post has a thickness W2, and the fixing portion has a width W, wherein W≥W1+W2.

7. The battery system according to claim 6, wherein the support frame further comprises a reinforcing beam disposed in the accommodating space, wherein the reinforcing beam comprises a plurality of fixing rods, and the battery lower casing is also connected to the target object through the fixing rods;
a plurality of second positioning holes are respectively disposed at two sides of the supporting portion of the reinforcing beam with respect to the hanging portion in a longitudinal direction, wherein a part of the positioning posts are disposed correspond to the first positioning holes, and the other part of the positioning post are disposed corresponding to the second positioning holes; and
there is a gap W1' between the positioning post and the adjacent hanging portion, the positioning post has a thickness W2, and the supporting portion has a width W' at a side of the hanging portion, wherein W'≥W1'+W2.

8. The battery system according to claim 3, wherein the fixing portion comprises a plurality of first positioning holes, and the positioning posts are disposed corresponding to the first positioning holes; and
there is a gap W1 between the positioning post and the adjacent fixing beam, the positioning post has a thickness W2, and the fixing portion has a width W, wherein W≥W1+W2.

9. The battery system according to claim 3, wherein a plurality of second positioning holes are respectively disposed at two sides of the supporting portion of the reinforcing beam with respect to the hanging portion in a longitudinal direction, wherein a part of the positioning posts are disposed correspond to the first positioning holes, and the other part of the positioning post are disposed corresponding to the second positioning holes; and
there is a gap W1' between the positioning post and the adjacent hanging portion, the positioning post has a thickness W2, and the supporting portion has a width W' at a side of the hanging portion, wherein W'≥W1'+W2.

10. The battery system according to claim 9, wherein the cover further comprises a second through hole corresponding to the fixing rod of the reinforcing beam, the battery system further comprises a fixing member comprising a base and a protruding shaft connected to each other, and the protruding shaft passes through the second through hole and is sealingly connected to the fixing rod.

11. The battery system according to claim 3, wherein the fixing rod is a hollow rod, the bottom plate comprises first through holes disposed corresponding to the fixing rods, and the fixing rod comprises an internal thread at an end away from the supporting portion.

12. The battery system according to claim 3, wherein the frame comprises a pair of opposite end plates disposed outside of the cells and a strapping band surrounding the end plates and the cells, and the positioning posts are disposed at least on the end plate.

13. The battery system according to claim 12, wherein the fixing portion comprises a plurality of first positioning holes, and the positioning posts are disposed corresponding to the first positioning holes; and there is a gap W1 between the positioning post and the adjacent fixing beam, the positioning post has a thickness W2, and the fixing portion has a width W, wherein W≥W1+W2.

14. The battery system according to claim 13, wherein the support frame further comprises a reinforcing beam disposed in the accommodating space, wherein the reinforcing beam comprises a plurality of fixing rods, and the battery lower casing is also connected to the target object through the fixing rods;

a plurality of second positioning holes are respectively disposed at two sides of the supporting portion of the reinforcing beam with respect to the hanging portion in a longitudinal direction, wherein a part of the positioning posts are disposed correspond to the first positioning holes, and the other part of the positioning post are disposed corresponding to the second positioning holes; and there is a gap W1' between the positioning post and the adjacent hanging portion, the positioning post has a thickness W2, and the supporting portion has a width W' at a side of the hanging portion, wherein W'≥W1'+W2.

* * * * *